United States Patent [19]
Wolf

[11] Patent Number: 5,835,031
[45] Date of Patent: Nov. 10, 1998

[54] FACILITY AND METHOD FOR TRANSMITTING DIGITIZED SIGNALS

[75] Inventor: Michael Wolf, Mundelsheim, Germany

[73] Assignee: Alcatel N.V., Rijswijk, Netherlands

[21] Appl. No.: 683,100

[22] Filed: Jul. 16, 1996

[30] Foreign Application Priority Data

Jul. 19, 1995 [DE] Germany .................. 195 26 332.4

[51] Int. Cl.$^6$ ............................................. H03M 7/100
[52] U.S. Cl. ........................ 341/61; 341/123; 375/354
[58] Field of Search ..................... 341/61, 110, 123; 375/354

[56] References Cited

U.S. PATENT DOCUMENTS

| | | | |
|---|---|---|---|
| 4,870,661 | 9/1989 | Yamada et al. ................... | 375/122 |
| 5,291,140 | 3/1994 | Wagner ............................ | 324/615 |
| 5,387,910 | 2/1995 | Medan et al. ..................... | 341/61 |
| 5,400,024 | 3/1995 | Nishimura et al. ................ | 341/61 |
| 5,483,239 | 1/1996 | Arczynski et al. ................ | 341/141 |
| 5,513,209 | 4/1996 | Holm ................................. | 375/354 |
| 5,621,404 | 4/1997 | Heiss et al. ....................... | 341/61 |

FOREIGN PATENT DOCUMENTS 43154205   5/1994   Germany .

OTHER PUBLICATIONS

"A High-Performance Transparent Bridge", M. Zitterbart et al, *IEEE Transactions on Networking*, vol. 2, No. 4, Aug.1 994, pp. 352–362.

"DV-und TK-Integration in globalen Unternehmensnetzen aug dem Weg zu AtM(Teil 1)", A. Badach , *NTZ*, vol. 47 (1994), No. 7, pp. 474–483.

"Modernes Netzmanagemetn heute/Stand der Entwicklungen", K. Jobmann et al, *Telekom Praxis*, April. 1994, pp. 23–28.

B. Keiser et al, "Digital Telephony and Network Intergration", Van Nostrand Reinhold Co., New York, 1985, pp. 378–389.

*Primary Examiner*—Marc S. Hoff
*Attorney, Agent, or Firm*—Ware, Fressola, Van Der Sluys, Adolphson LLP

[57] ABSTRACT

When digitized signals are transmitted from a digital transmission system (NET1), e.g. a PDH system, to another digital transmission system (NET2), e.g. a SDH system, which operate at different clock rates ($f_1$, $f_2$), the clock rate must be adapted during the transition. To that end, the digitized signals are converted into discrete-time and value-discrete signals in a decoding unit (D1) at the clock rate ($f_1$) of the one digital transmission system (NET1). A conversion unit (UE1) converts the discrete-time and value-discrete signals into further discrete-time and value-discrete signals, whose pulse repetition rate is adapted to a clock rate derived from the clock rate ($f_2$) of the other digital transmission system (NET2). This is achieved e.g. with a low-pass filter (FIL1) and a sample-and-hold device (AH1). An encoding unit (K1) converts the further discrete-time and value-discrete signals into digital signals, whose bit rate is adapted to the clock rate ($f_2$) of the other digital transmission system (NET2), which allows the digital signals to be transmitted in the other digital transmission system (NET2).

8 Claims, 2 Drawing Sheets

FACILITY AND METHOD FOR TRANSMITTING DIGITIZED SIGNALS

TECHNICAL FIELD

The invention concerns a facility a method for transmitting digitized signals.

BACKGROUND OF THE INVENTION

Digitized signals are digital signals derived from analog signals such as e.g. audio signals, which are digitized so that they can be transmitted via a digital transmission system. Such a digital transmission system is e.g. a PCM system (PCM=Pulse Code Modulation), a PDH system (PDH= Plesiochronous Digital Hierarchy) or an SDH system (SDH=Synchronous Digital Hierarchy).

The book "Digital Telefony and Network Integration" by B. Keiser and F. Strange, 1985, Van Nostrand Reinhold Company, Inc., ISBN 0 442-24659-5, describes on pages 378 to 388 how a transmission of signals takes place from one digital transmission system to another digital transmission system. To that end a master clock is generated in a central location, independently of the two digital transmission systems. Both digital transmission systems are clocked with this master clock, which avoids clock-rate adaptation problems during the transition from one digital transmission system to the other. One disadvantage is that the master clock and its transmission must meet very stringent accuracy requirements. This is furthermore a rigid concept, since both digital transmission systems must operate with the same master clock. If the master clock fails in one or in both digital transmission systems, the digital connections between the two digital transmission systems are disturbed.

DISCLOSURE OF INVENTION

It is therefore the task of the invention to prevent clock-rate adaptation problems during the transition from one digital transmission system to another digital transmission system.

According to a first aspect of the present invention, a facility for transmitting digitized signals from a first digital transmission system to a second digital transmission system which operate at different clock rates, comprises a decoding unit, a conversion unit, and an encoding unit, wherein the decoding unit is controllable at the clock rate of the first digital transmission system, wherein the conversion unit and the encoding unit are controllable at the clock rate of the second digital transmission system, wherein the digitized signals of the first digital transmission system are convertible in the encoding unit to discrete-time and value-discrete signals, wherein the discrete-time and value-discrete signals are convertible in the conversion unit to further discrete-time and value-discrete signals whose pulse repetition rate is adapted to a clock rate derived from the clock rate of the second digital transmission system, and wherein the further discrete-time and value-discrete signals are convertible in the encoding unit to digital signals whose bit rate is adapted to the clock rate of the second digital transmission system.

In further accord with this first aspect of the invention, the facility further comprises a further decoding unit, a further conversion unit, and a further encoding unit for transmitting digitized signal from the second digital transmission system to the first digital transmission system, wherein the further decoding unit is controllable at the clock rate of the second digital transmission system, wherein the further conversion unit and the further encoding unit are controllable at the clock rate of the first digital transmission system, wherein the digitized signals of the second digital transmission system are convertible in the further decoding unit to discrete-time and value-discrete signals, and wherein the discrete-time and value-discrete signals are convertible in the further conversion unit to further discrete-time and value-discrete signals whose pulse repetition rate is adapted to the clock rate of the first digital transmission system, and that the further discrete-time and value-discrete signals are convertible in the further encoding unit to digital signals whose bit rate is adapted to the clock rate of the first digital transmission system.

In still further accord with the first aspect of the invention, the facility comprises a first clock recovery unit and a second clock recovery unit, wherein in the first clock recovery unit the clock rate of the first digital transmission system is recoverable from the digitized signals of the first digital transmission system, wherein in the second clock recovery unit, the clock rate of the second digital transmission system is recoverable from the digitized signals of the second digital transmission system, wherein the decoding unit, the further encoding unit, and the further conversion unit are controllable by the first clock recovery unit, and wherein the further decoding unit, the encoding unit and the conversion unit are controllable by the second clock recovery unit.

Further according to the first aspect of the invention, the conversion unit contains a low-pass filter and a sample-and-hold device, wherein the discrete-time and value-discrete signals are convertible in the low-pass filter to analog signals, and wherein the analog signals are convertible in the sample-and-hold device to further discrete-time and value-discrete signals.

According still further to the first aspect of the invention, the decoding unit and the low-pass filter form part of a digital-to-analog converter, and that the sample-and-hold device and the encoding unit form part of an analog-to-digital converter.

Still in accord with the first aspect of the invention, the conversion unit comprises a computing device.

Further in accord with the first aspect of the invention, the facility is implemented as an integrated circuit.

According to a second aspect of the present invention, a method of transmitting digitized signals from a first digital transmission system to a second digital transmission system which operate at different clock rates, comprises the steps of converting the digitized signals of the first digital transmission system to discrete-time and value-discrete signals at a clock rate derived from the clock rate of the first digital transmission system; converting the discrete-time and value-discrete signals to further discrete-time and value-discrete signals at a clock rate derived from the clock rate of the second digital transmission system, the pulse repetition rate of the further discrete-time and value-discrete signals being adapted to the clock rate derived from the second digital transmission system; and converting the further discrete-time and value-discrete signals to digital signals at the clock rate of the second digital transmission system, the bit rate of the digital signals being adapted to the clock rate of the second digital transmission system.

A special advantage of the invention are autonomous digital transmission systems with autonomous clocks.

These and other objects, features and advantages of the present invention will become more apparent light of the detailed description of a best mode embodiment thereof, as illustrated in the accompanying drawing."

BEST MODE FOR CARRYING OUT THE INVENTION

Figure 1:
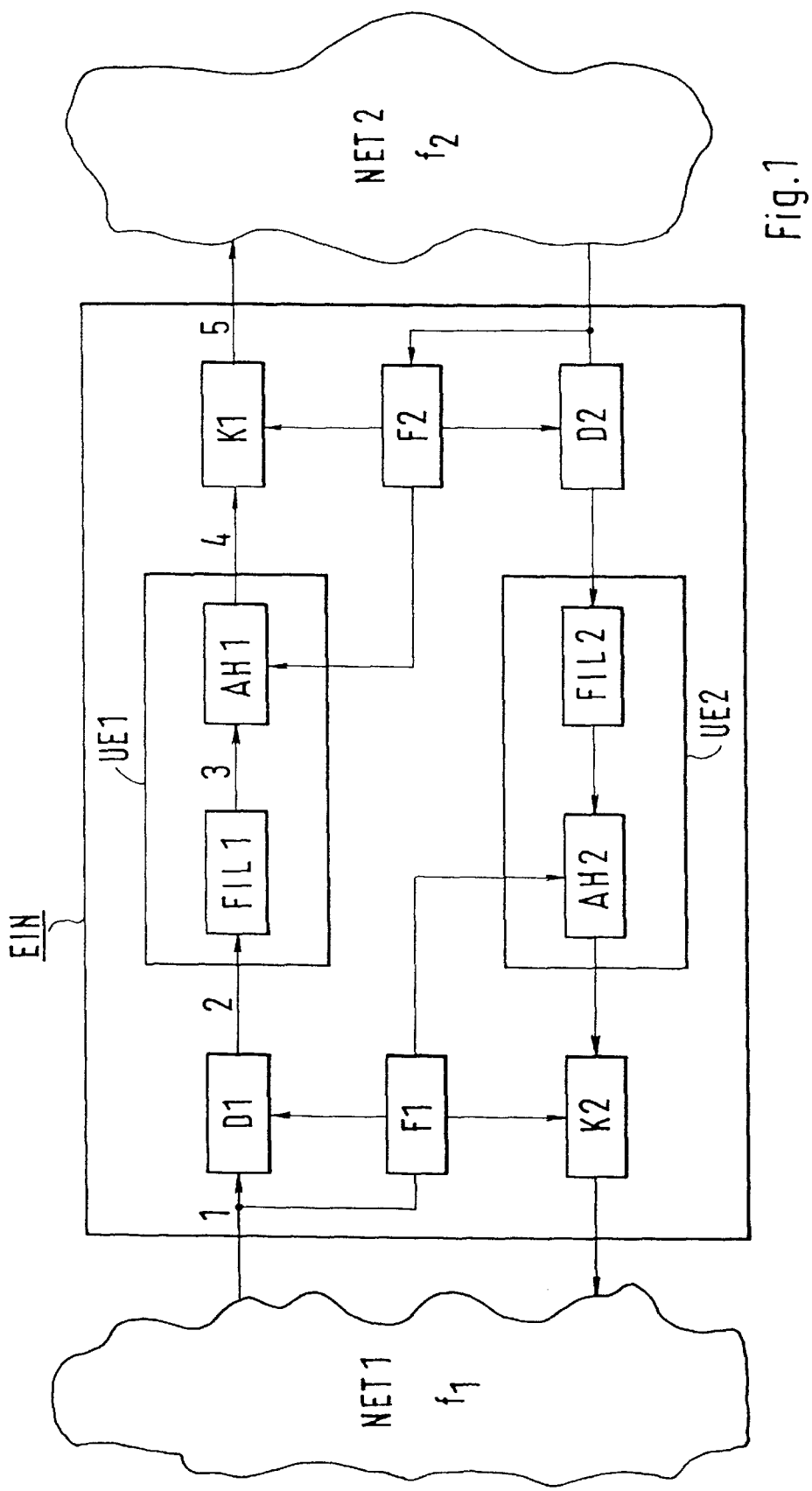
FIG. 1 is a schematic illustration of a facility for transmitting digitized signals in conjunction with two digital transmission systems, and FIGS. 2(1) through 2(5) are schematic illustrations of five signals at five different points of the facility in FIG. 1.

A configuration example of the invention will now be described by means of FIGS. 1 and 2. FIG. 1 illustrates two digital transmission systems NET1, NET2 and a facility EIN for transmitting digitized signals.

The digital transmission system NET1 is e.g. a PCM system (PCM=Pulse Code Modulation). It operates at the clock rate $f_1$.

The digital transmission system NET2 is e.g. an SDH system (SDH=Synchronous Digital Hierarchy). It operates at the clock rate $f_2$.

Digitized signals are transmitted in both digital transmission systems. Digitized signals are digital signals derived from analog signals that are digitized. Analog signals are e.g. telephone, audio or video signals. To be able to transmit analog signals via a digital transmission system NET1, NET2, the signals must be digitized. The digitization takes place e.g. with a sample-and-hold device and an encoder. The sample-and-hold device converts the analog signals into discrete-time and value-discrete signals, which are then converted by the encoding unit into digital binary signals with a bit rate that corresponds to the clock rate $f_1$, $f_2$ of the respective digital transmission system NET1, NET2.

If digitized signals are to be transmitted from one digital transmission system NET1, NET2 to another digital transmission system NET1, NET2, and if the clock rates $f_1$, $f_2$ of both digital transmission systems NET1, NET2 differ from each other, the clock rate must be adapted during the transition from the one NET1, NET2 to the other NET2, NET1 digital transmission system.

The facility EIN is used for this clock rate adaptation. The facility EIN comprises a decoding unit D1, a conversion unit UE1 and an encoding unit K1 for transmitting digitized signals from the digital transmission system NET1 to the digital transmission system NET2.

The decoding unit D1 has a signal input, a signal output and a clock input. The decoding unit D1 converts digital signals with a binary bit rate into discrete-time and value-discrete signals. Depending on the resolution, a bit rate of four bits is e.g. converted into a pulse. The significance of the bit positions of the digital sequence at the determined bit rate is given, e.g., as $2^3 2^2 2^1 2^0$. The bit sequence 0010 is therefore converted into a pulse with an amplitude of 2, the bit sequence 1001 into a pulse with an amplitude of 9, etc. The decoding unit D1 is controlled at the clock rate $f_1$ of digital transmission system NET1.

The conversion unit UE1 has a signal input, a signal output and a clock input. The conversion unit UE1 converts discrete-time and value-discrete signals into discrete-time and value-discrete signals whose pulse repetition rate differs from the pulse repetition rate of the input signals. Furthermore the resolution, i.e. the number of possible amplitude values, can also differ. The pulse repetition rate of the input signals is therefore e.g. 4 KHz, and that of the output signals is 8 KHz.

The conversion unit UE1 contains a low-pass filter FIL1 and a sample-and-hold device AH1. The discrete-time and value-discrete signals on the input side are filtered in the low-pass filter FIL1 and are thereby converted into analog signals. The analog signals are routed to the sample-and-hold device AH1 where they are sampled at a frequency that differs from the pulse repetition rate of the input signals. In this way the output of the sample-and-hold device AH1, and thereby the output of the conversion unit UE1, contain discrete-time and value-discrete signals with a pulse repetition rate that corresponds to the sampling frequency. The conversion unit UE1 is controlled at the clock rate $f_2$ of digital transmission system NET2.

The encoding unit K1 has a signal input, a signal output and a clock input. The operation mode of encoding unit K1 is inverse to the operation mode of decoding unit D1, the difference being that the encoding unit K1 operates at a different clock frequency. The encoding unit K1 is controlled at the clock rate $f_2$ of digital transmission system NET2.

The encoding unit K1 converts discrete-time and value-discrete signals into digital signals. The pulse amplitudes of the discrete-time and value-discrete signals are converted into binary bit sequences. Depending on the resolution, e.g. four bits with bit positions having significance of $2^3 2^2 2^1 2^0$, a pulse with an amplitude of 5 is converted e.g. into the bit sequence 0101.

To transmit digitized signals from digital transmission system NET1 to digital transmission system NET2, the digitized signals of digital transmission system NET1 which are being transmitted are first routed to the decoding unit D1. In the decoding unit D1, the digitized signals are converted into discrete-time and value-discrete signals at the clock rate $f_1$ of the digital transmission system NET1. The pulse repetition rate of the discrete-time and value-discrete signals depends on the resolution. The pulse repetition rate is adapted to a clock rate derived from the clock rate $f_1$. The clock rate $f_1$ is an integral multiple of the derived clock rate and an integral multiple of the pulse repetition rate. The discrete-time and value-discrete signals are routed to the low-pass filter FIL1. They are converted into analog signals in the low-pass filter FIL1. The analog signals are routed to the sample-and-hold device AH1. In the sample-and-hold device AH1 the analog signals are sampled at a sampling frequency that depends on the resolution, at the clock rate $f_2$ of the digital transmission system NET2. The pulse repetition rate of the discrete-time and value-discrete signals created at the output of the sample-and-hold device AH1 is adapted to a clock rate that is derived from the clock rate $f_2$. The clock rate $f_2$ is an integral multiple of the derived clock rate, as well as of the pulse repetition rate. The derived frequency is obtained e.g. with a frequency divider. The discrete-time and value-discrete signals, which are adapted to the derived clock rate, are routed to the encoding unit K1. The discrete-time and value-discrete signals are converted into digital signals in the encoding unit K1. The conversion takes place at the clock rate $f_2$, whereby binary bit sequences are created, which can be transmitted in the digital transmission system NET2. Depending on the resolution, each pulse of the discrete-time and value-discrete signals is converted into a binary bit sequence at the clock rate $f_2$. In this way the bit rate of the digital output signals is adapted to the clock rate $f_2$ and can be used for transmission to the digital transmission system NET2.

The decoding unit D1 and the low-pass filter FIL1 can therefore form part of a digital/analog converter, which is controlled at the clock rate $f_1$. The sample-and-hold device AH1 and the encoding unit K1 can form part of a digital/analog converter, which is controlled at the clock rate $f_2$.

The facility EIN contains a decoding unit D2, a conversion unit UE2 and an encoding unit K2 for transmitting digitized signals from the digital transmission system NET2 to the digital transmission system NET1.

The decoding unit D2 corresponds to decoding unit D1, except that it is controlled at the clock rate $f_2$ of the digital transmission system NET2.

The conversion unit UE2 corresponds to conversion unit UE1, except that it is controlled at the clock rate $f_1$ of the digital transmission system NET1.

The encoding unit K2 corresponds to encoding unit K1, except that it is controlled at the clock rate $f_1$.

The conversion unit UE2 contains a low-pass filter FIL2 and a sample-and-hold device AH2. The sample-and-hold device AH2 is controlled at the clock rate $f_1$.

When digitized signals are transmitted from digital transmission system NET2 to digital transmission system NET1, the digitized signals being transmitted are converted in decoding unit D2 into discrete-time and value-discrete signals, which are routed to the low-pass filter FIL2 where they are converted into analog signals. The analog signals are sampled in the sample-and-hold device AH2, which creates discrete-time and value-discrete signals with a pulse repetition rate that is adapted to a clock rate derived from the clock rate $f_1$ of the digital transmission system NET1. The discrete-time and value-discrete signals are converted in encoding unit K2 into digital signals, whose bit rate is adapted to the clock rate $f_1$, which makes transmission in the digital transmission system NET1 possible. Thus, the transmission of digitized signals from digital transmission system NET2 to digital transmission system NET1 takes place in the same way as the transmission of digitized signals from digital transmission system NET1 to digital transmission system NET2.

The analog signals are recovered from the digital signals, e.g. by using a decoding unit D1 controlled at the clock rate $f_1$ and a downstream low-pass filter FIL1 in the digital transmission system NET1, and a decoding unit D2 controlled at the clock rate $f_2$ and a downstream low-pass filter FIL2 in the digital transmission system NET2.

The facility EIN also contains a clock recovery unit F1 and a clock recovery unit F2. The clock recovery units F1 and F2 have the same construction and are used to recover the clock from a digital signal. Each has one input and three outputs.

The input side of clock recovery unit F1 is connected to the signal input of decoding unit D1, and the output side is connected to the clock inputs of decoding unit D1, encoding unit K2 and the sample-and-hold device AH2. The clock recovery unit F1 recovers the clock rate $f_1$ from the digitized signals of digital transmission system NET1, for control of decoding unit D1, encoding unit K2 and the sample-and-hold device AH2.

The input side of clock recovery unit F2 is connected to the signal input of decoding unit D2, and the output side is connected to the clock inputs of decoding unit D2, encoding unit K1 and the sample-and-hold device AH1. The clock recovery unit F2 recovers the clock rate $f_2$ from the digitized signals of digital transmission system NET2, for reversing the decoding unit D2, the encoding unit K1 and the sample-and-hold device AH1.

Figure 2:
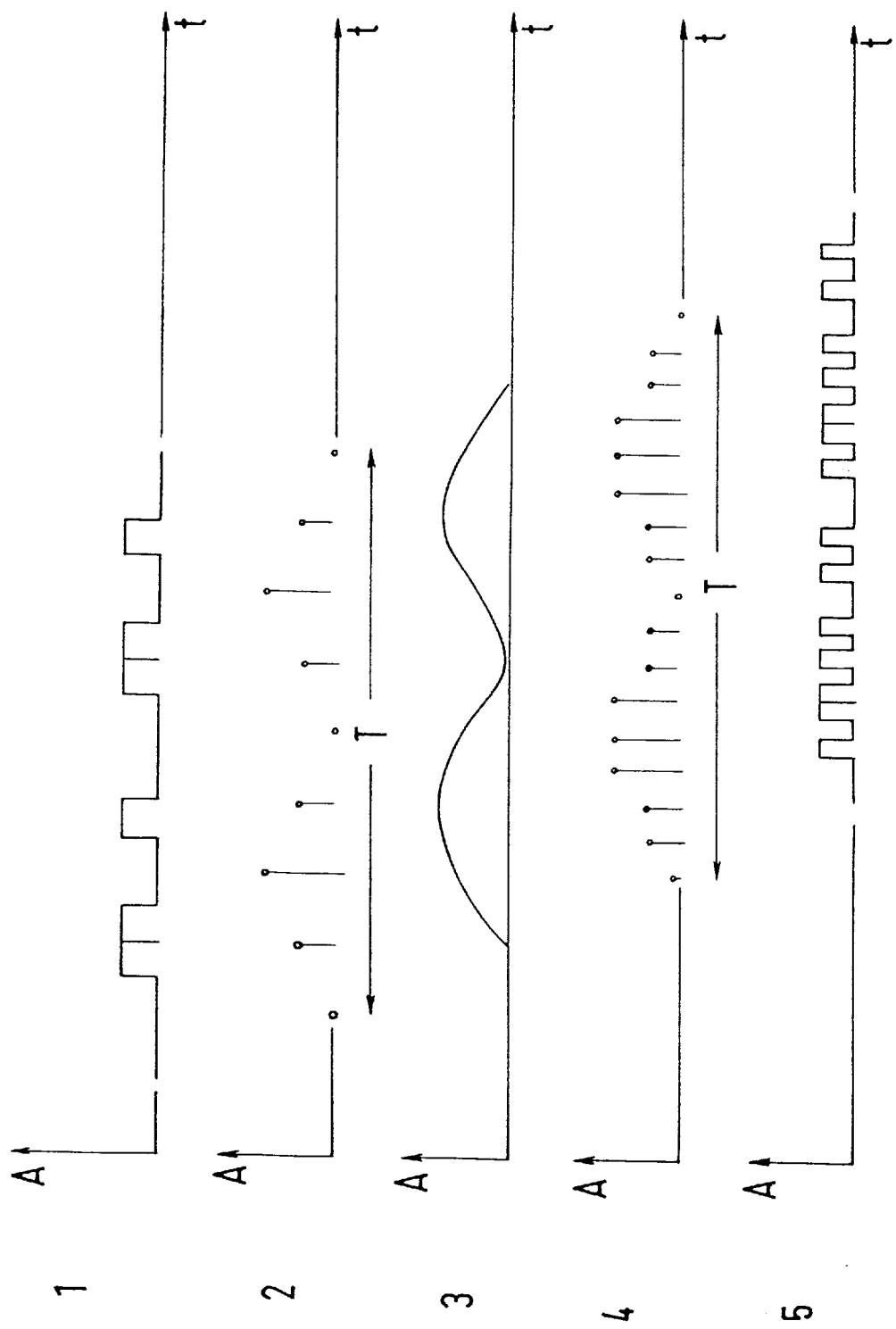

FIGS. 2(1)–2(5) depict five signals at five different points of the facility EIN in FIG. 1. A signal on a line 1, as shown in FIG. 2(1), is a binary bit sequence located at a signal input of decoding unit D1. The signal on the line 1 represents a digitized signal from digital transmission system NET1. The bit rate is the same as the clock rate $f_1$.

A signal on a line 2, as shown in FIG. 2(2) is a discrete-time and value-discrete signal with quantized amplitude values A at equidistant points in time t. The signal on the line 2 is located at a signal output of decoding unit D1, at a signal input of conversion unit UE1 and at a signal input of low-pass filter FIL1. It originates from the signal on the line 1.

A signal on a line 3 is shown in FIG. 2(3) and is an analog signal which is located at a signal output of low-pass filter FIL1, and at the signal input of sample-and-hold device AH1. It originates from the signal on the line 2.

A signal on a line 4 is shown in FIG. 2(4) and is a discrete-time and value-discrete signal, like the signal on the line 2. In contrast to the signal on the line 2, the signal on the line 4 has more quantized amplitude values A and more equidistant points in time t within the same time window T. The signal on the line 4 originates from the signal on the line 3. In the depicted case, the clock rate $f_2$ is greater than clock rate $f_1$.

A signal on a line 5 is shown in FIG. 2(5) and is located at a signal output of encoding unit K1. It is a binary bit sequence with a bit rate equal to clock rate $f_2$ and represents a digital signal that can be transmitted in the digital transmission system NET2. The signal on the line 5 originates from the signal on the line 4.

In the configuration example, the conversion unit UE1 contains a low-pass filter FIL1 and a sample-and-hold device AH1. To convert a discrete-time and value-discrete signal into a discrete-time and value-discrete signal with a different bit rate, a computing device such as, e.g., a microprocessor $\mu$P or a digital signal processor DSP can be used instead of the low-pass filter FIL1 and the sample-and-hold device AH1. The amplitude values of the output signal pulses are determined in the following manner from the input signal:

1. By linear interpolation

The sampling instants of the output pulses are determined by a frequency divider, which is controlled at the clock rate $f_2$ and adjusted according to the resolution for each rising or falling slope of the output clock of the frequency divider. For each sampling instant of the output signal, the two nearest sampling instants of the input signal are determined. The amplitude values of the pulses at these two sampling instants are added and then divided by two. The result is compared to the possible quantized amplitude values of the output signal determined by the resolution. The amplitude value closest to the result forms the amplitude value for the output pulse at the respective sampling instant, or as an alternative:

2. By digital low-pass filtering

An auxiliary clock rate is produced in the computing device; it is an integral multiple, e.g. n-times (where n=10 to 100) the clock rate $f_1$. A signal with the auxiliary clock rate is produced from the input signal with the clock rate $f_1$, in which for each sampling instant $t_1$ with the sampling value $A_1$, n sampling values with the amplitude of sampling value $A_1$ are produced at n successive sampling instants of the auxiliary clock rate. The thus obtained signal with the auxiliary clock rate is smoothed in a digital low-pass filter and the pulses of the output signal are subsequently produced by using the neighboring sampling times of the auxiliary clock rate with the smoothed sampling values, at the sampling instances that correspond to the clock rate $f_2$. In that case the clock rate $f_2$ is smaller than the auxiliary clock rate.

Comparably to conversion unit UE1, conversion unit UE2 can also be implemented with a computing device instead of the low-pass filter FIL2 and the sample-and-hold device AH2.

In addition, all the elements of facility EIN can be implemented with an integrated circuit, so that the entire facility EIN can be configured as an integrated circuit.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A facility (EIN) for transmitting digitized signals from a first digital transmission system (NET1) to a second digital transmission system (NET2) which operate at different clock rates ($f_1$, $f_2$), said facility (EIN) comprising a decoding unit (D1), a conversion unit (UE1), and an encoding unit (K1), wherein the decoding unit (D1) is controllable at the clock rate ($f_1$) of the first digital transmission system (NET1), wherein the conversion unit (UE1) and the encoding unit (K1) are controllable at the clock rate ($f_2$) of the second digital transmission system (NET2), wherein the digitized signals of the first digital transmission system (NET1) are convertible in the encoding unit (D1) to discrete-time and value-discrete signals, wherein the discrete-time and value-discrete signals are convertible in the conversion unit (UE1) to further discrete-time and value-discrete signals whose pulse repetition rate is adapted to a clock rate derived from the clock rate ($f_2$) of the second digital transmission system (NET2), and wherein the further discrete-time and value-discrete signals are convertible in the encoding unit (K1) to digital signals whose bit rate is adapted to the clock rate ($f_2$) of the second digital transmission system (NET2).

2. A facility (EIN) as claimed in claim 1, wherein the facility (EIN) further comprises a further decoding unit (D2), a further conversion unit (UE2), and a further encoding unit (K2) for transmitting digitized signal from the second digital transmission system (NET2) to the first digital transmission system (NET1), wherein the further decoding unit (D2) is controllable at the clock rate ($f_2$) of the second digital transmission system (NET2), wherein the further conversion unit (UE2) and the further encoding unit (K2) are controllable at the clock rate ($f_1$) of the first digital transmission system (NET1), wherein the digitized signals of the second digital transmission system (NET2) are convertible in the further decoding unit (D2) to discrete-time and value-discrete signals, and wherein the discrete-time and value-discrete signals are convertible in the further conversion unit (UE2) to further discrete-time and value-discrete signals whose pulse repetition rate is adapted to the clock rate ($f_1$) of the first digital transmission system (NET1), and that the further discrete-time and value-discrete signals are convertible in the further encoding unit (K2) to digital signals whose bit rate is adapted to the clock rate ($f_1$) of the first digital transmission system (NET1).

3. A facility (EIN) as claimed in claim 2, wherein the facility (EIN) comprises a first clock recovery unit (F1) and a second clock recovery unit (F2), wherein in the first clock recovery unit (F1) the clock rate ($f_1$) of the first digital transmission system (NET1) is recoverable from the digitized signals of the first digital transmission system (NET1), wherein in the second clock recovery unit (F2), the clock rate ($f_2$) of the second digital transmission system (NET2) is recoverable from the digitized signals of the second digital transmission system (NET2), wherein the decoding unit (D1), the further encoding unit (K2), and the further conversion unit (UE2) are controllable by the first clock recovery unit (F1), and wherein the further decoding unit (D2), the encoding unit (K1) and the conversion unit (UE1) are controllable by the second clock recovery unit (F2).

4. A facility (EIN) as claimed in claim 1, wherein the conversion unit (UE1) contains a low-pass filter (FIL1) and a sample-and-hold device (AH1), wherein the discrete-time and value-discrete signals are convertible in the low-pass filter (FIL1) to analog signals, and wherein the analog signals are convertible in the sample-and-hold device (AH1) to further discrete-time and value-discrete signals.

5. A facility (EIN) as claimed in claim 4, wherein the decoding unit (D1) and the low-pass filter (FIL1) form part of a digital-to-analog converter, and that the sample-and-hold device (AH1) and the encoding unit (K1) form part of an analog-to-digital converter.

6. A facility (EIN) as claimed in claim 1, wherein the conversion unit (UE1) comprises a computing device ($\mu$P, DSP).

7. A facility (EIN) as claimed in claim 1, implemented as an integrated circuit.

8. A method of transmitting digitized signals from a first digital transmission system (NET1) to a second digital transmission system (NET2) which operate at different clock rates ($f_1$, $f_2$), said method comprising the steps of:

converting the digitized signals of the first digital transmission system (NET1) to discrete-time and value-discrete signals at a clock rate derived from the clock rate ($f_1$) of the first digital transmission system (NET1);

converting the discrete-time and value-discrete signals to further discrete-time and value-discrete signals at a clock rate derived from the clock rate ($f_2$) of the second digital transmission system (NET2), the pulse repetition rate of the further discrete-time and value-discrete signals being adapted to the clock rate derived from the second digital transmission system (NET2); and converting the further discrete-time and value-discrete signals to digital signals at the clock rate ($f_2$) of the second digital transmission system (NET2), the bit rate of the digital signals being adapted to the clock rate ($f_2$) of the second digital transmission system (NET2).

* * * * *

UNITED STATES PATENT AND TRADEMARK OFFICE
CERTIFICATE OF CORRECTION

PATENT NO. : 5,835,031
DATED : November 10, 1998
INVENTOR(S) : WOLF

It is certified that error appears in the above-identified patent and that said Letters Patent is hereby corrected as shown below:

On the title page

INID [56] References Cited - Under Foreign Patent Documents 43154205 should read --4315420--.

Signed and Sealed this

Sixteenth Day of March, 1999

Attest:

Q. TODD DICKINSON

*Attesting Officer*      *Acting Commissioner of Patents and Trademarks*